(12) United States Patent
Nishibayashi et al.

(10) Patent No.: US 8,713,336 B2
(45) Date of Patent: Apr. 29, 2014

(54) COMMUNICATION APPARATUS, POWER SUPPLY CONTROL METHOD, DISPLAY APPARATUS, COMMUNICATION METHOD, AND COMPUTER PROGRAM PRODUCT

(75) Inventors: Yasuyuki Nishibayashi, Kanagawa (JP); Naoki Esaka, Kanagawa (JP); Shinya Murai, Kanagawa (JP); Masataka Goto, Kanagawa (JP); Kensaku Yamaguchi, Kanagawa (JP); Hiroshi Kawazoe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 820 days.

(21) Appl. No.: 12/461,625

(22) Filed: Aug. 18, 2009

(65) Prior Publication Data

US 2010/0050006 A1 Feb. 25, 2010

(30) Foreign Application Priority Data

Aug. 21, 2008 (JP) ................................. 2008-213062

(51) Int. Cl.
*G06F 1/26* (2006.01)
*G06F 1/32* (2006.01)

(52) U.S. Cl.
USPC ........... 713/320; 713/300; 713/323; 713/324; 345/52; 345/211

(58) Field of Classification Search
USPC ............. 713/300, 320, 323, 324; 345/52, 211
See application file for complete search history.

(56) References Cited

U.S. PATENT DOCUMENTS

| 6,784,855 B2 | 8/2004 | Matthews et al. |
| 2006/0061951 A1* | 3/2006 | Hara ............................. 361/683 |
| 2007/0183340 A1* | 8/2007 | Kim ............................. 370/252 |

FOREIGN PATENT DOCUMENTS

| JP | 63-194445 | 8/1988 |
| JP | 63-292850 | 11/1988 |
| JP | 02-042842 | 2/1990 |
| JP | 08-297622 | 11/1996 |
| JP | 2000-151749 | 5/2000 |
| JP | 2002-512458 | 4/2002 |
| JP | 2002-323942 | 11/2002 |
| JP | 2004-180244 | 6/2004 |
| JP | 2007-293729 | 11/2007 |

OTHER PUBLICATIONS

Office Action dated Nov. 22, 2011 in JP Application No. 2008-213062 with English-language translation.

* cited by examiner

*Primary Examiner* — Kim Huynh
*Assistant Examiner* — Michael J Brown
(74) *Attorney, Agent, or Firm* — Nixon & Vanderhye, P.C.

(57) ABSTRACT

The detecting unit detects a disconnection of communications that have been established with a display apparatus. When the disconnection of the communications is detected, the message generating unit generates a confirmation message that confirms whether the communications should be reestablished. The transmitting unit transmits the confirmation message to the display apparatus. The receiving unit receives a reply message that indicates whether the communications should be reestablished from the display apparatus. The main power supply controlling unit shuts down the main power supply when the reply message indicates that the communications should not be reestablished, or when no reply message is received.

5 Claims, 10 Drawing Sheets

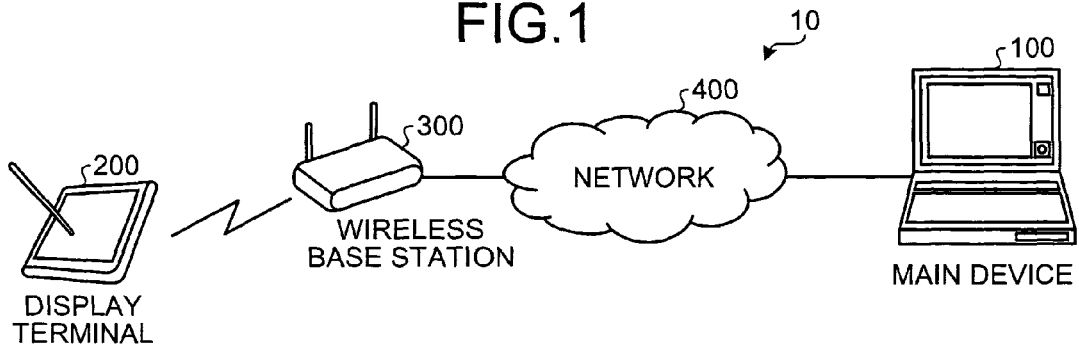
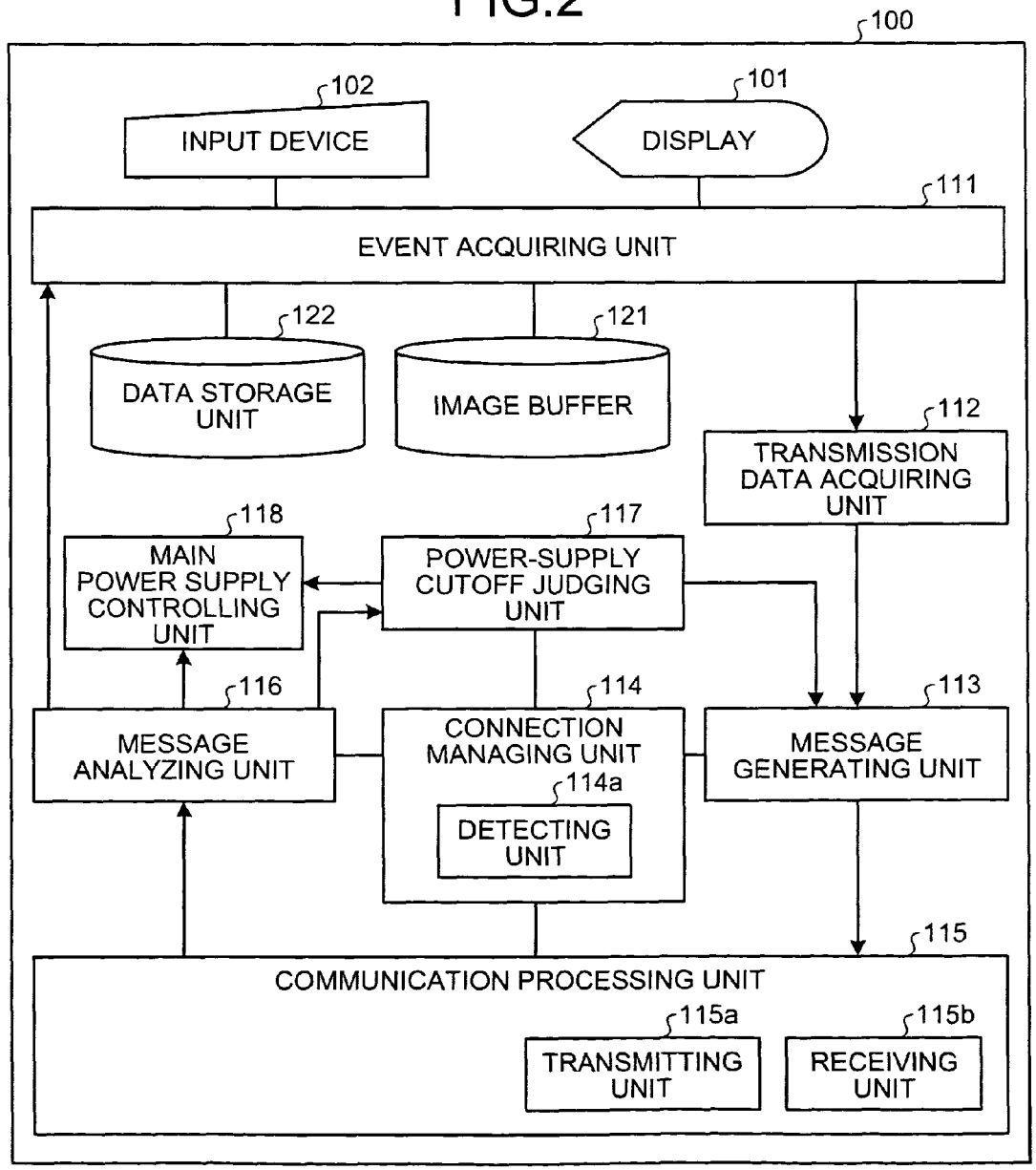

FIG.4

| OPERATION MODE OF DISPLAY TERMINAL | POSSIBILITY OF RECONNECTION TO MAIN DEVICE |
|---|---|
| REMOTELY CONTROLLING COMPUTER FUNCTION OF MAIN DEVICE | YES |
| REMOTELY BROWSING MEDIA DATA ON MAIN DEVICE | YES |
| BROWSING MEDIA DATA ON EXTERNAL MEMORY DEVICE | NO |
| POWER SUPPLY BEING OFF (NOT ALLOWED TO OBTAIN INFORMATION FROM OPERATION MODE STORAGE UNIT) | NO |

FIG.5

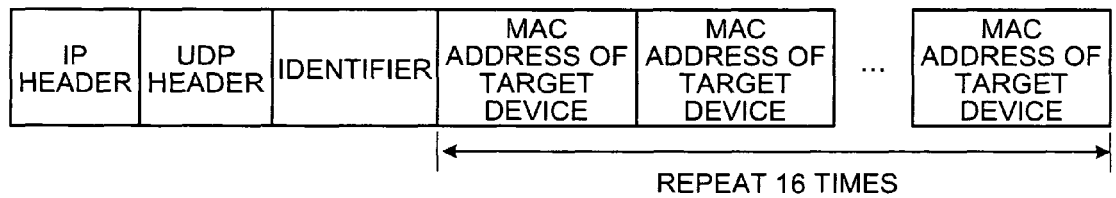

| IP HEADER | UDP HEADER | IDENTIFIER | MAC ADDRESS OF TARGET DEVICE | MAC ADDRESS OF TARGET DEVICE | ... | MAC ADDRESS OF TARGET DEVICE |

REPEAT 16 TIMES

FIG.6

| IP HEADER | UDP HEADER | IDENTIFIER | RESPONSE WAITING TIME |

FIG.7

| IP HEADER | UDP HEADER | IDENTIFIER | POSSIBILITY OF RECONNECTION | PROBABLE CONNECTION TIME |

COMMUNICATION APPARATUS, POWER SUPPLY CONTROL METHOD, DISPLAY APPARATUS, COMMUNICATION METHOD, AND COMPUTER PROGRAM PRODUCT

CROSS-REFERENCE TO RELATED APPLICATIONS

This application is based upon and claims the benefit of priority from the prior Japanese Patent Application No. 2008-213062, filed on Aug. 21, 2008; the entire contents of which are incorporated herein by reference.

BACKGROUND OF THE INVENTION

1. Field of the Invention

The present invention relates to a communication apparatus, a power supply control method, a computer program product for power supply control, a display apparatus, a communication method, and a computer program product for communication, for realizing a function of sharing a screen of an application between apparatuses.

2. Description of the Related Art

To improve usability, computing systems have been offered, in which a terminal having a minimum input/output interface is arranged on a user's side, while complicating calculating processes are executed on a machine that is arranged at a remote location. For example, U.S. Pat. No. 6,784,855 and JP-A 2002-323942 (KOKAI) disclose technologies of systems in which the screen information of a communication apparatus (such as a personal computer and a server computer) is displayed on a remote display apparatus (display terminal) on a network.

In such a system, information input from the display terminal (e.g. information input with a stylus pen of a digitizer) is transmitted to the communication apparatus so that the actual process of an application program is executed by the communication apparatus on the network. Then, execution results and screen update information are transmitted to the display apparatus. The display terminal executes a drawing process, based on the received screen update information.

Meanwhile, a technology called Wake on LAN (WOL) has been offered, with which a computer connected to a local area network (LAN) is activated by a remote computer on the network. With the WOL technology applied to the above computing system, the user is allowed to control the main power supply of the communication apparatus remotely from the display apparatus, without directly operating the main switch of the communication apparatus.

The communication apparatus activated by the WOL can return to the power-off state by setting a timer on the side of the communication apparatus and turning the power off when no input operation is performed for a certain period of time. For example, JP-A 2002-323942 (KOKAI) teaches a display terminal technology of shifting to a power-saving saving mode when no input is performed for a certain period of time.

With the method of shutting off the power when the function of the communication apparatus is not in use for a predetermined period of time, the power is not always turned off appropriately. For example, the judgment as to whether the function of the communication apparatus is not in use for a predetermined period of time may be made with a method of detecting that the communications between the display terminal and the communication apparatus are disconnected.

Communications could be disconnected for different reasons, however. The reasons may be: (1) that the user turns the power of the display terminal off; (2) that wireless communications are in poor condition, and are temporarily disconnected; (3) that the operation mode of the display terminal is changed when the display terminal makes an access to data resources stored in the communication apparatus such as video data, music data, and photograph data and reproduces the data through streaming; and (4) that the operation mode is changed when the display terminal reproduces media data stored in its own memory device.

In the situations of (1) and (4), no problem arises when the communication apparatus is turned off. However, in the situations of (2) and (3), communications should be reestablished with the communication apparatus, and thus the communication apparatus should not be turned off. Once it is turned off, the WOL start-up procedure needs to be conducted from the beginning to reconnect the display terminal to the communication apparatus, which would lower the usability.

However, when the communications are disconnected, it is impossible for the communication apparatus to judge the cause of the disconnection and determine whether the display terminal wants to be reconnected. Thus, it has been difficult to turn the power off exclusively when the display terminal is not actually using data resources or processing functions of the communication apparatus.

To reduce the possibilities of turning the power off in the situations of (2) and (3), the standby time before switching to the shut-down or power-saving mode could be set longer. This would raise a problem of wasting power, however, because the communication apparatus cannot be turned off for a predetermined period of time even if the display apparatus does not at all use the data resources or processing functions of the communication apparatus.

SUMMARY OF THE INVENTION

According to one aspect of the present invention, a communication apparatus includes a detecting unit that detects a disconnection of established connections that are established with a display apparatus capable of displaying image data; a generating unit that generates a confirmation message to confirm whether reconnections are to be established when the disconnection of the established connections is detected; a transmitting unit that transmits the confirmation message to the display apparatus; a receiving unit that receives from the display apparatus a reply message indicating whether the reconnections are to be established and responding to the confirmation message; and a main power supply controlling unit that turns off main power supply for the communication apparatus when the reply message indicates that the reconnections are not to be established, or when the reply message is not received.

According to another aspect of the present invention, a power supply control method includes detecting a disconnection of established connections between a communication apparatus and a display apparatus capable of displaying image data; generating a confirmation message to confirm whether reconnections are to be established when the disconnection of the established connections is detected; transmitting the confirmation message to the display apparatus; receiving from the display apparatus a reply message indicating whether the reconnections are to be established and responding to the confirmation message; and turning off main power supply for the communication apparatus when the reply message indicates that the reconnections are not to be established, or when the reply message is not received.

According to still another aspect of the present invention, a display apparatus includes a receiving unit that receives from a communication apparatus, a confirmation message that confirms whether connections are to be established with the communication apparatus that transmits image data; a judging unit that judges whether the connections are to be established based on an operation mode of the display apparatus, when the confirmation message is received; a generating unit that generates a reply message indicating whether the connections are to be established and responding to the confirmation message, based on a judgment result made by the judging unit; and a transmitting unit that transmits the reply message to the communication apparatus.

According to still another aspect of the present invention, a communication method includes receiving from a communication apparatus, a confirmation message that confirms whether connections are to be established with the communication apparatus that transmits image data; judging whether the connections are to be established based on an operation mode of a display apparatus, when the confirmation message is received; generating a reply message indicating whether the connections are to be established, based on a judgment result; and transmitting the reply message to the communication apparatus.

A computer program product according to still another aspect of the present invention causes a computer to perform the methods according to the present invention.

BRIEF DESCRIPTION OF THE DRAWINGS

FIG. 1 is a diagram for illustrating a structure of a communication system according to a first embodiment;

FIG. 2 is a block diagram of a main device according to the first embodiment;

FIG. 4 is a diagram for illustrating the relationship between the operation mode of the display terminal and the possibility of reconnection;

FIG. 5 is a diagram for illustrating an example of a WOL magic packet;

FIG. 6 is a diagram for illustrating an example of a confirmation message;

FIG. 7 is a diagram for illustrating an example of a reply message;

DETAILED DESCRIPTION OF THE INVENTION

Figure 3:
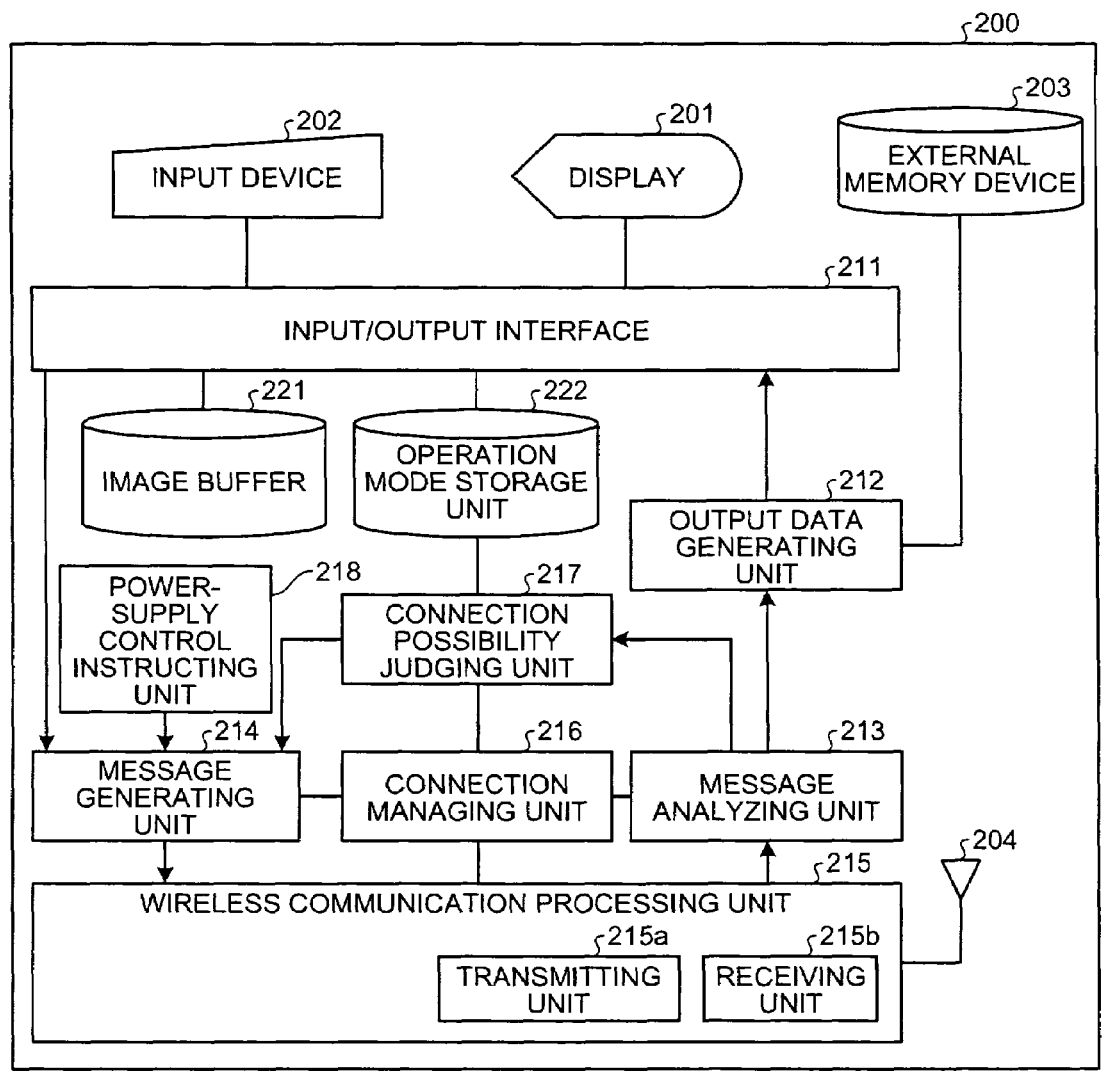
FIG. 3 is a block diagram of a display terminal according to the first embodiment.

Exemplary embodiments of a communication apparatus, a power supply control method, a computer program product for power supply control, a display apparatus, a communication method, and a computer program product for communication according to the present invention are explained in detail below with reference to the attached drawings.

A communication system according to a first embodiment includes a main device (communication apparatus) that executes an application and a display terminal (display apparatus) that displays a screen updated by the executed application. When a disconnection of connections that have been established with the display terminal is detected, the main device sends a confirmation message to the display terminal to confirm whether there is a possibility of reestablishing communications later (reconnection possibility), and controls the switching-off operation of the main device in accordance with a reply message received in response to the confirmation message.

As illustrated in FIG. 1, a communication system 10 according to the first embodiment includes a main device 100 that serves as a communication apparatus, a wireless base station 300 connected to the main device 100 on a network 400, and a display terminal 200 that has a link with the wireless base station 300 on a wireless LAN to establish wireless communications.

The communication system 10 has an application screen transmitting function, with which a screen of an application software program running on the main device 100 is transmitted to the display terminal 200 via the wireless base station 300 so that the application software screen is displayed on the display terminal 200.

In the communication system 10, because the screen updated by the main device 100 needs to be transmitted to the display terminal 200 in real time, only an updated portion of image data on the screen of the main device 100 is transmitted. In other words, the main device 100 is configured to transmit image data to the display terminal 200 that displays the image data, via the wireless base station 300.

The main device 100 has a streaming transmission function, with which media data stored therein such as video data, music data, and photograph data is transmitted to the display terminal 200 via the wireless base station 300, and the media is played back through streaming on the display terminal 200.

The display terminal 200 plays back the media data received from the main device 100 on a display or a speaker. Furthermore, the display terminal 200 has a function of playing back media data stored in an external memory device connected thereto such as a memory card. The user operates the display terminal 200 to select and use a desired function from the functions of playing back the media data in the main device 100 and of playing back the media data in the external memory device.

The functions of the display terminal 200 are not limited to the above, however. The display terminal 200 may be provided with simple functions such as memo storing and calendar displaying.

The wireless base station 300 is a base station for wireless communications according to a wireless communication protocol such as IEEE 802.11. The network 400 is realized by a cable communication protocol such as IEEE 802.3. The networking architecture is not limited thereto, and the connections may be established according to other protocols. The display terminal 200 and the main device 100 may be connected on a cable network.

The structure of the main device 100 is explained in detail below with reference to FIG. 2. The main device 100 includes a display 101, an input device 102, an image buffer 121, a data storage unit 122, an event acquiring unit 111, a transmission data acquiring unit 112, a message generating unit 113, a connection managing unit 114, a communication processing unit 115, a message analyzing unit 116, a power-supply cutoff judging unit 117, and a main power supply controlling unit 118.

The display 101 is a display apparatus realized by a liquid crystal display (LCD) or the like. The input device 102 is realized by a mouse or the like that operates the move of a cursor displayed on the screen of the display 101. Alternately, a keyboard or a trackball may be adopted for the input device 102.

The image buffer 121 is a memory unit that stores therein images. The data storage unit 122 stores media data such as video data, music data, and photograph data. Video data represents media data generated in accordance with video compression standards such as MPEG-2/4 and H.264. Music data represents media data generated in accordance with audio compression standards such as Linear Pulse Code Modulation (LPCM) and MPEG Audio Layer 3 (MP3). Photograph data represents media data generated in accordance with still image compression standards such as Joint Photographic Experts Group (JPEG).

The image buffer 121 and the data storage unit 122 can be realized by any conventionally used storage medium such as a hard disk drive (HDD) and a solid state drive (SSD).

The event acquiring unit 111 acquires an event produced by an operation of an application program or the like. The event acquiring unit 111 is realized, for example, by an operating system (OS) that performs overall management on the computer, a display driver incorporated in this OS, and an application program such as application software that runs on the OS.

The event acquiring unit 111 acquires an update of the screen (image) as an event when the screen is updated by the application software or when the cursor is moved in accordance with the operation of the mouse and a certain area of the screen image is updated. When an event of the screen update is acquired, a virtual display driver that constitutes the event acquiring unit 111 obtains a drawing instruction from the graphic engine of the OS and executes a drawing process so that updated images can be generated and sequentially sent to and stored in the image buffer 121. In this manner, the updated images are sequentially held in the image buffer 121.

Furthermore, the event acquiring unit 111 reads data from the data storage unit 122 by way of a disk driver provided in the OS. In other words, the event acquiring unit 111 has functions of generating image data that is to be displayed on the display terminal 200 in accordance with the event produced by the operation of the application program and also of generating media data from the data that is read from the data storage unit 122.

The transmission data acquiring unit 112 acquires the image data and media data generated by the event acquiring unit 111 as transmission data that is to be transmitted to the display terminal 200, and sends the data to the message generating unit 113.

The message generating unit 113 generates a transmission message based on the address information and port number information of the display terminal 200 and information on the transmission control protocol (transmission control information), and sends the message out via the communication processing unit 115. As the transmission control protocol, the Transmission Control Protocol (TCP) of the Transmission Control Protocol/Internet Protocol (TCP/IP), which provides reliable transmission, and the User Datagram Protocol (UDP), which provides transmission without reliability, may be adopted.

According to the present embodiment, the image data that is to be displayed on the display terminal 200 in accordance with an event issued by the operation of the application program and the media data that is read from the data storage unit 122 are transmitted according to the TCP.

The message generating unit 113 also generates a confirmation message, when the connection managing unit 114 that is discussed below detects a disconnection of the communications (connection), to confirm whether the communications should be reestablished, and sends the message to the display terminal 200.

The connection managing unit 114 manages the connection established with the display terminal 200. More specifically, the connection managing unit 114 stores and manages a sender address, a sender port number, a receiver address, a receiver port number, and conditions of the established connection in a management-use storage unit (not shown). The connection managing unit 114 executes the TCP connection initializing and terminating processes by way of the communication processing unit 115.

The connection managing unit 114 includes a detecting unit 114*a* that detects a disconnection of the established connection. The detecting unit 114*a* detects a disconnection of the established connection when, for example, a TCP session is disconnected upon timeout, or the number of retransmissions of the TCP data from the main device 100 reaches a predetermined threshold value.

The communication processing unit 115 transmits and receives messages to and from external devices such as the display terminal 200. The communication processing unit 115 includes a transmitting unit 115*a* that transmits messages and a receiving unit 115*b* that receives messages. For example, the communication processing unit 115 transmits a message generated by the message generating unit 113 to the main device 100, receives a message from the main device 100, and passes it to the message analyzing unit 116.

The communication processing unit 115 is realized by a cable communication function in accordance with the IEEE 802.3 or the like. Power is supplied to the communication processing unit 115 even when the main power supply of the main device 100 is off. This is to realize the WOL function in the off state of the main power switch, for turning the main power supply on upon receiving a WOL message called "magic packet".

The message analyzing unit 116 issues, when the communication processing unit 115 receives the WOL magic packet, an instruction regarding the control of the main power supply of the main device 100 to the main power supply controlling unit 118. In other words, the message analyzing unit 116 issues the instruction to the main power supply controlling unit 118 to turn on the main power supply that has been shut down.

The message analyzing unit 116 notifies the event acquiring unit 111 of the input information received from the display terminal 200 such as stylus input and media data selection information. When the event acquiring unit 111 of the main device 100 processes the input information, the image of the corresponding area of the screen is updated, and the updated image is stored in the image buffer 121. Then, the transmission data acquiring unit 112 acquires a difference in the screen area as image data, and transmits it to the display terminal 200.

The media data selection information refers to information for identifying the media data stored in the data storage unit 122 of the main device 100, for which a Uniform Resource Identifier (URI) may be adopted.

After analyzing the selection information notified of by the message analyzing unit 116, the event acquiring unit 111 acquires the media data stored in the data storage unit 122, and passes it to the transmission data acquiring unit 112. The communication system 10 according to the present embodiment transmits the input information and the media data selection information by use of the TCP.

When the detecting unit 114a of the connection managing unit 114 detects the disconnection of the established connection between the main device 100 and the display terminal 200, the power-supply cutoff judging unit 117 exchanges specific messages with the display terminal 200 to determine whether the main power supply should be turned off.

More specifically, when the disconnection of the established connection is detected, the power-supply cutoff judging unit 117 issues an instruction to the message generating unit 113 to generate and transmit a confirmation message to confirm the possibility of reconnection. The power-supply cutoff judging unit 117 has a timer function so that, when a reply message is not received from the display terminal 200 in response to the transmitted confirmation message after a predetermined period of time elapses, the power-supply cutoff judging unit 117 issues an instruction of turning the main power supply off to the main power supply controlling unit 118.

If a reply message is received from the display terminal 200 within the predetermined period of time and the received reply message indicates that there is no possibility of reconnection, the power-supply cutoff judging unit 117 determines the cutoff of the main power supply. According to the present embodiment, the confirmation message is transmitted in accordance with the UDP. The confirmation message, however, may be transmitted in accordance with any other protocol than the UDP. The confirmation message may be retransmitted multiple times by taking the reliability of the network into consideration.

The main power supply controlling unit 118 controls the main power supply of the main device 100. The main power supply controlling unit 118 should control the main power supply by a standard for the main power supply such as the Advanced Configuration and Power Interface (ACPI). Then, the OS included in the event acquiring unit 111 should also be compatible with the ACPI function.

The main power supply controlling unit 118 turns off the main power supply in response to the instruction issued by the power-supply cutoff judging unit 117, for example, when the received reply message indicates no possibility of reconnection or when no reply message is received.

The structure of the display terminal 200 is explained in detail below with reference to FIG. 3. The display terminal 200 includes a display 201, an input device 202, an external memory device 203, an antenna 204, an image buffer 221, an operation mode storage unit 222, an input/output interface 211, an output data generating unit 212, a message analyzing unit 213, a message generating unit 214, a wireless communication processing unit 215, a connection managing unit 216, a connection possibility judging unit 217, and a power-supply control instructing unit 218. In addition, the display terminal 200 further includes a speaker for outputting audio data although it is not shown.

The display 201 is a display apparatus realized by an LCD or the like. The input device 202 is realized by a digitizer, a touch screen, or the like to operate and move a cursor displayed on the screen of the display 201. The input information acquired by the input device 202 is passed to the input/output interface 211 (described later).

The external memory device 203 is realized by a memory device such as an SD (Secure Digital) card that can be connected to the display terminal 200 via a certain interface. The external memory device 203 stores therein the media data such as video data, music data, and photograph data. In a similar manner to the media data received from the main device 100, the display terminal 200 acquires the media data stored in the external memory device 203, executes a decoding process on the data at the output data generating unit 212 (described later), and outputs the data via the input/output interface 211 to the display 201 and the speaker.

The antenna 204 transmits and receives radio waves to and from external devices such as the main device 100.

The image buffer 221 is a memory unit that stores therein images. The operation mode storage unit 222 stores therein the current operation mode of the display terminal 200. The operation modes may include (1) remotely controlling the computer function of the main device 100, (2) remotely browsing the media data on the main device 100, and (3) browsing the media data on the external memory device 203. The operation modes are not limited to the above. For example, an operation mode indicating the use of a simple function such as the memo function and the calendar display function as mentioned above may be defined. The image buffer 221 can be realized by a graphic memory device. And the operation mode storage unit 222 can be realized by any conventionally used memory medium such as an HDD and an SSD.

The input/output interface 211 is an interface used for the input/output of the display 201 and the input device 202 and realized by an application program such as Graphical User Interface (GUI).

The input/output interface 211 acquires, for example, image data from the image buffer 221 and displays it on the display 201. The input/output interface 211 acquires the image data and the media data from the main device 100 by way of the output data generating unit 212, and writes the data into the image buffer 221. In addition to such functions, the input/output interface 211 has a function of writing GUI image data generated within the display terminal 200 into the image buffer 221.

In the communication system 10 according to the present embodiment, the user selects a desired function from the GUI screen displayed on the screen of the display 201. Then, an operation mode of the display terminal 200 corresponding to the selected function is stored in the operation mode storage unit 222.

The output data generating unit 212 generates output data from the data received from the main device 100 to output onto the display 201 or the like. For example, when receiving image data that is generated in response to an event produced in accordance with the operation of the application program on the main device 100, the output data generating unit 212 writes the received image data at a designated drawing position of the image buffer 221 via the input/output interface 211. In this situation, the output data generating unit 212 performs a decompressing process on the compressed image if necessary, and writes the decompressed image data into the image buffer 221.

In other words, when the image data is received from the main device 100, the output data generating unit 212 decomposes the received image data and displays a partial image of the screen of the decomposed image data at the designated position of the display 201.

On the other hand, when the media data is acquired from the external memory device 203 or the main device 100, the output data generating unit 212 performs a suitable decoding process on the media data in accordance with the data type such as video data, music data, and photograph data, and reproduces and displays the decoded data onto the display 201 or the like via the input/output interface 211. More specifically, the output data generating unit 212 sequentially updates items of the data in the image buffer 221 when data for image display, such as the video data and photograph data, is decoded. When sound data is decoded, the output data generating unit 212 outputs the sound through the speaker.

The message analyzing unit 213 analyzes the message received from the main device 100 via the wireless communication processing unit 215, and notifies the output data generating unit 212 or the connection possibility judging unit 217 of the message.

The message generating unit 214 generates a transmission message based on the address information, the port number information, and the transmission control information of the display terminal 200, and transmits the message via the wireless communication processing unit 215. For example, the message generating unit 214 generates a reply message that indicates the judgment result obtained by the connection possibility judging unit 217, and transmits it to the main device 100. The TCP or the UDP may be adopted as the transmission control protocol.

The wireless communication processing unit 215 exchanges signals with the wireless base station 300 via the antenna 204. The wireless communication processing unit 215 includes a transmitting unit 215a that transmits messages and a receiving unit 215b that receives messages. The wireless communication processing unit 215 is realized by a wireless LAN function in conformity with the IEEE 802.11, for example.

The connection managing unit 216 manages the connection established with the main device 100. More specifically, the connection managing unit 216 stores and manages the sender address, the sender port number, the receiver address, the address port number, and the condition of the established connection in the management-use storage unit (not shown). The connection managing unit 216 executes the initializing and terminating processes for the TCP connection via the wireless communication processing unit 215.

When the receiving unit 215b receives a confirmation message for confirming the possibility of reconnection from the main device 100, the connection possibility judging unit 217 analyzes the data in the operation mode storage unit 222 to judge the possibility of reconnection. Then, the connection possibility judging unit 217 issues an instruction to the message generating unit 214 to generate and transmit a reply message that indicates the judgment result. The reply message indicates either that there is a possibility of reconnection or that there is no possibility of reconnection. The message generating unit 214 transmits the reply message in accordance with the UDP. The reply message may be transmitted in accordance with any other protocol than the UDP.

In FIG. 4, the three operation modes that are discussed above and the possibility of reconnection judged by the connection possibility judging unit 217 in the corresponding operation modes are presented.

In the first operation mode, the display terminal 200 is remotely controlling the computer function of the main device 100 that is connected thereto via the network 400 (mode (1) in the above description). In this mode, the display terminal 200 transmits information input through the user's operation to the main device 100, and the application program of the main device 100 performs a process in accordance with the input information. As a result, the updated image generated in response to the produced event is transmitted as the image data from the main device 100. The image data received by the display terminal 200 is subjected to the processing at the output data generating unit 212, and then displayed onto the display 101.

In the second operation mode of FIG. 4, the display terminal 200 is remotely browsing the media data on the main device 100 (mode (2) in the above description). In this mode, the display terminal 200 selects the media data stored in the data storage unit 122 of the main device 100 such as the video data, the music data, and the photograph data, and receives it via the network 400. The media data received by the display terminal 200 is subjected to the processing at the output data generating unit 212, and output to the display 101 or the speaker.

The display terminal 200 may select one item from the media data stored in the main device 100 connected thereto via the network 400 by a method according to the Universal Plug and Play (UPnP), for example. As for a media data transmission method, the Hyper Text Transfer Protocol (HTTP) may be adopted.

In the third operation mode of FIG. 4, the display terminal 200 is browsing the media data of the external memory device 203 connected to the display terminal 200, without performing the communication process (mode (3) in the above description).

In the fourth operation mode of the drawing, the power supply of the display terminal 200 has been turned off. In this mode, the display terminal 200 cannot transmit a reply message to the main device 100, based on the information acquired from the operation mode storage unit 222.

In the first and second operation modes of the above example, after a confirmation message is received from the main device 100 due to the disconnection of the established connection detected by the main device 100, there is a possibility of reconnection with the main device 100.

On the other hand, when the display terminal 200 is browsing the media data on the external memory device 203, the communication process using the network 400 is not required. Thus, reconnection would not be established to the main device 100. In the off state of the power supply of the display terminal 200, reconnection would also not be established to the main device 100.

The display terminal 200 stores the current operation mode in the operation mode storage unit 222 every time the operation mode changes. Then, when the confirmation message is received from the main device 100, the connection possibility judging unit 217 judges the possibility of reconnection by referring to the stored operation mode, generates a reply message that indicates the judgment result, and transmits the message to the main device 100 from the transmitting unit 215a.

Instead of referring to the operation mode stored in the operation mode storage unit 222, the connection possibility judging unit 217 may be configured to detect the operation mode at the time of receiving the confirmation message.

To turn the main power supply of the main device 100, the power-supply control instructing unit 218 issues an instruction to the message generating unit 214 to generate and transmit a WOL magic packet. The message generating unit 214 transmits the WOL magic packet in accordance with the UDP.

Next, the messages exchanged between the main device 100 and the display terminal 200 are explained in detail below with reference to FIGS. 5 to 7.

As illustrated in FIG. 5, a WOL magic packet includes an Internet Protocol (IP) header, a UDP header, an identifier, and a Medium Access Control (MAC) address of a target device. The IP header represents control information of a network layer. The UDP header is a header for the transmission control of a transport layer. For the identifier, unique information that identifies the message as a WOL magic packet is provided. In particular, 6 bytes of a value "0xFF" are arranged for the identifier. As for the MAC address of the target device, the MAC address of the communication processing unit 115 of the WOL-compliant main device 100 is repeated 16 times. When receiving a message that contains those elements, the communication processing unit 115 of the main device 100 starts the main power supply.

As illustrated in FIG. 6, a confirmation message contains an IP header, a UDP header, an identifier, and a response waiting time. The IP header and the UDP header are the same as the information explained with reference to FIG. 5. For the identifier, unique information that indicates a message for confirming the possibility of reconnection is provided. The response waiting time represents a period of time between the transmission of the confirmation message from the main device 10 to the display terminal 200 and the reception of a reply message. When no reply message is received from the display terminal 200 after the response waiting time, the main device 100 determines that the main power supply should be turned off.

As illustrated in FIG. 7, the reply message contains an IP header, a UDP header, an identifier, the possibility of reconnection, and probable connection time. The IP header and the UDP header are the same as the information explained with reference to FIGS. 5 and 6. For the identifier, unique information that indicates a reply message showing the possibility of reconnection is provided.

The possibility of reconnection is a field designating whether there is a possibility of the display terminal 200 being reconnected to the main device 100. When the connection possibility judging unit 217 judges that there is a possibility, the message generating unit 214 sets the value of the reconnection possibility field to "1", for example, to notify that there is a possibility of reconnection. On the other hand, when the connection possibility judging unit 217 judges that there is no possibility, the message generating unit 214 sets the value of the reconnection possibility field to "0" to notify that there is no possibility of reconnection. The method of designating the value of the field is not limited thereto. For example, "0" may be set when there is a possibility, and "1" may be set when there is no possibility.

The probable connection time is supplemental information that indicates, when the display terminal 200 is using the processing function or data resource of the main device 100, a probable length of time of the use. The main device 100 may be configured to turn the power off after the probable connection time elapses, based on this information.

Figure 8:
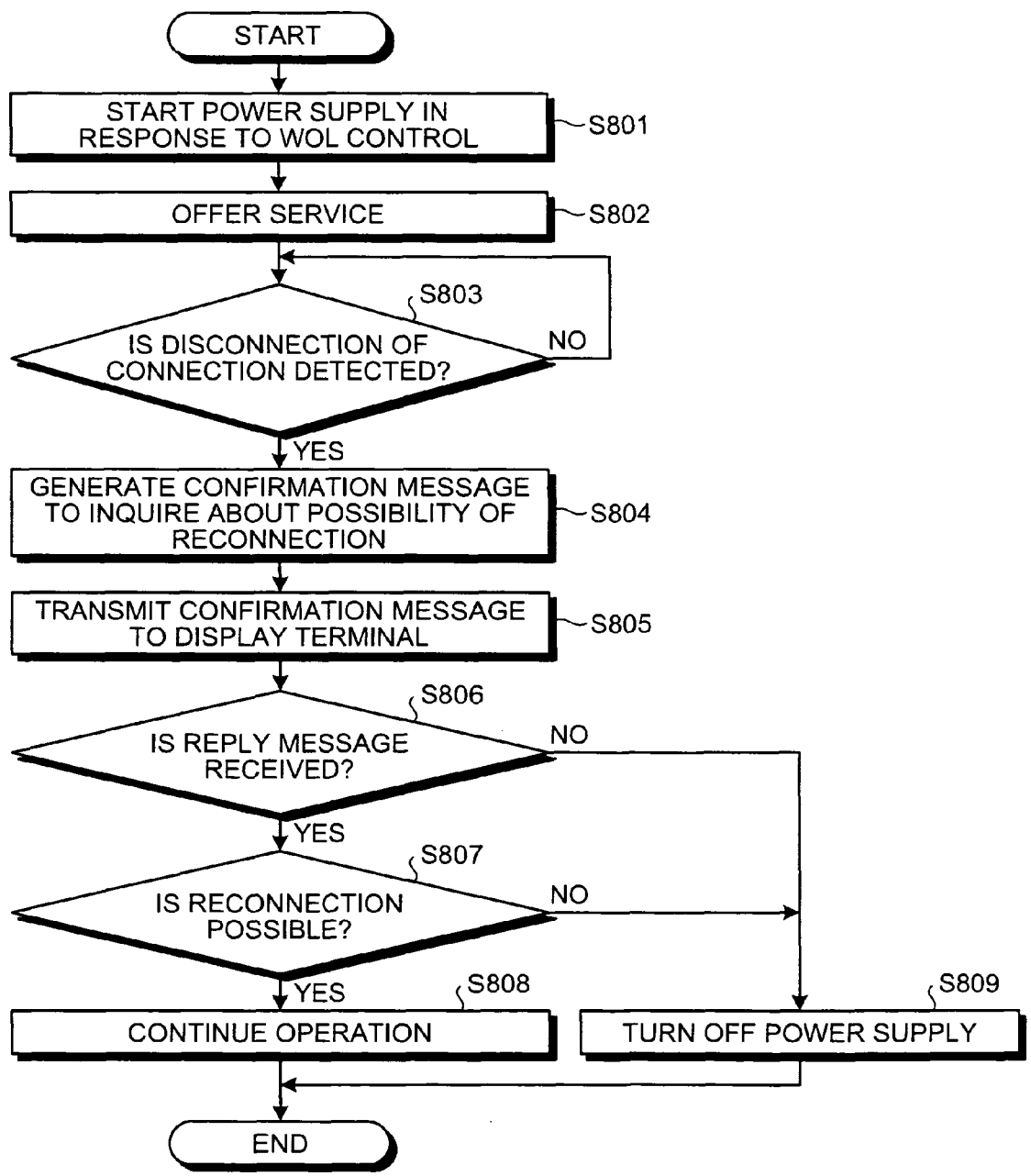
FIG. 8 is a flowchart of the entire power supply controlling process according to the first embodiment.

The power supply controlling process performed by the main device 100 that is configured in the above manner according to the first embodiment is explained below with reference to FIG. 8.

First, in response to the instruction issued by the power-supply control instructing unit 218 of the display terminal 200, the message generating unit 214 transmits a WOL magic packet to the main device 100. Upon receiving the WOL magic packet via the communication processing unit 115, the message analyzing unit 116 issues an instruction to the main power supply controlling unit 118 to turn on the main power supply.

In other words, the main power supply controlling unit 118 starts the main power supply in response to the WOL control from the instruction message analyzing unit 116 (step S801). Next, the main device 100 offers service to the display terminal 200 in accordance with the information input by the display terminal 200 (step S802). The service means the remote controlling of the computer function of the main device 100, the remote browsing of the media data stored in the data storage unit 122 of the main device 100, and the like, as discussed above.

During the service being offered, the detecting unit 114a of the connection managing unit 114 judges whether the disconnection of the established connection to the display terminal 200 is detected (step S803). When no disconnection of the established connection is detected (no at step S803), the process is continued until it is detected.

When a disconnection of the established connection is detected (yes at step S803), the power-supply cutoff judging unit 117 issues an instruction to the message generating unit 113 to generate and transmit a confirmation message. The message generating unit 113 generates a confirmation message in response to this instruction (step S804). Then, the transmitting unit 115a of the communication processing unit 115 transmits the generated confirmation message to the display terminal 200 (step S805).

Next, the power-supply cutoff judging unit 117 judges whether a reply message is received within a predetermined period of time (step S806). When a reply message is received within a predetermined period of time (yes at step S806), the power-supply cutoff judging unit 117 judges whether the received reply message indicates that there is a possibility of reconnection (step S807). For example, the power-supply cutoff judging unit 117 may judge whether the value of the reconnection possibility field of the reply message as shown in FIG. 7 is set to "1" (possible to reconnect).

When the reply message indicates that there is a possibility of reconnection (yes at step S807), the power-supply cutoff judging unit 117 allows the main device 100 to continue operating, without issuing a main power cutoff instruction to the main power supply controlling unit 118 (step S808).

When the reply message indicates that there is no possibility of reconnection (no at step S807), or when no reply message is received within a predetermined period of time at step S806 (no at step S806), the power-supply cutoff judging unit 117 issues an instruction to the main power supply controlling unit 118 to turn off the main power supply. In response to this instruction, the main power supply controlling unit 118 turns off the main power supply (step S809).

Figure 9:
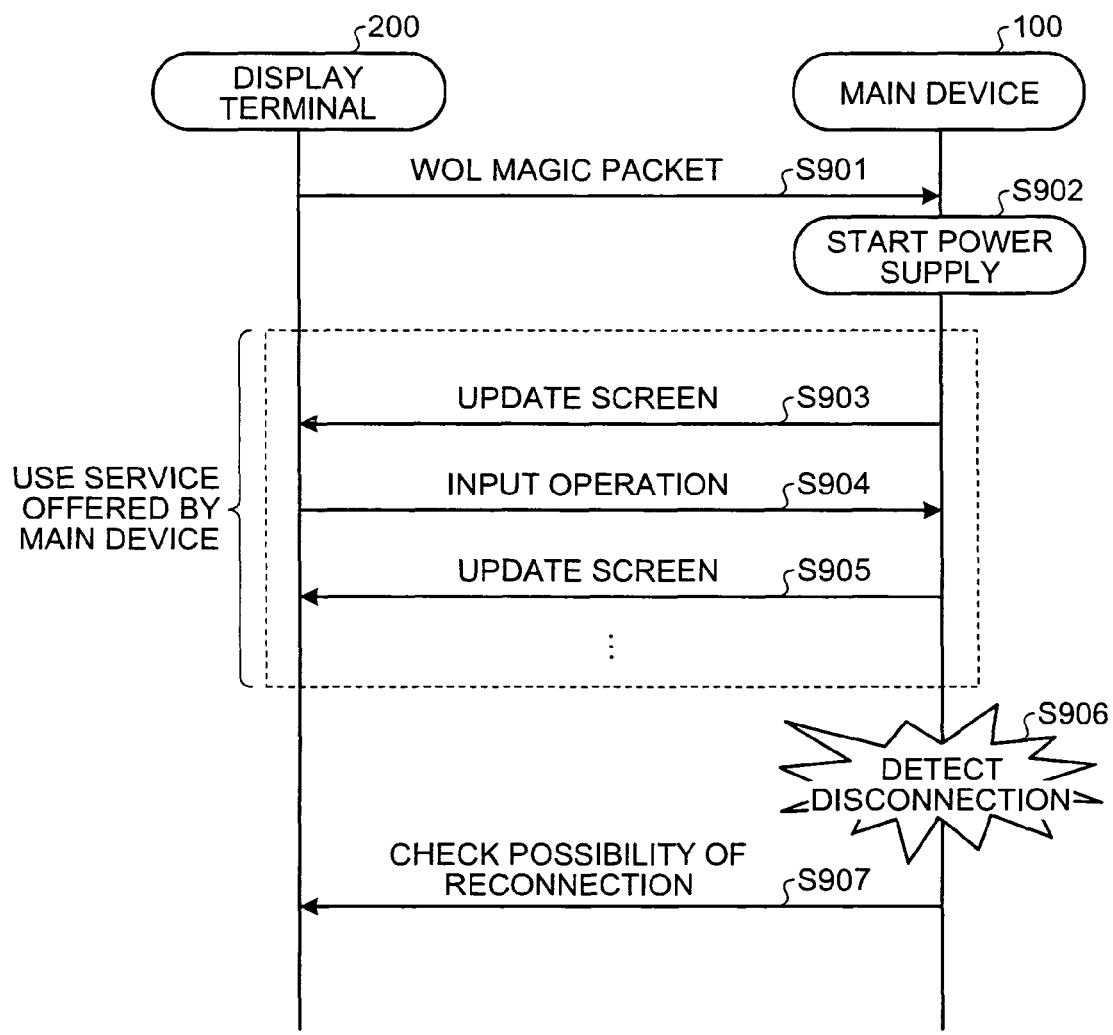
FIG. 9 is a sequence diagram including a message exchange sequence between the display terminal and the main device according to the first embodiment.
Figure 10:
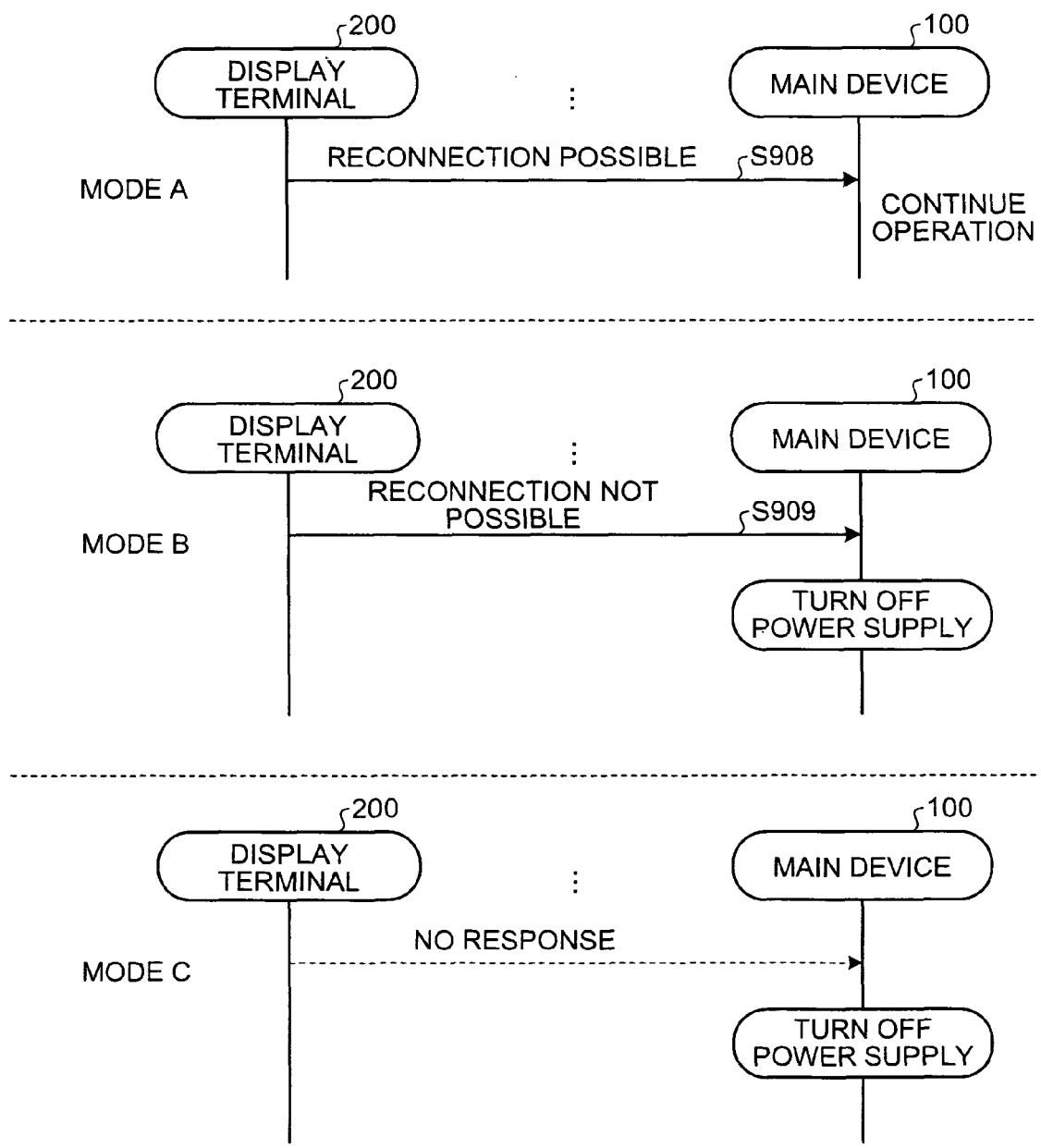
FIG. 10 is a sequence diagram including a message exchange sequence between the display terminal and the main device according to the first embodiment.

FIGS. 9 and 10 are diagrams including sequences of message exchange between the display terminal 200 and the main device 100 according to the first embodiment.

As described above, first, the display terminal 200 transmits the WOL magic packet to the main device 100 (step S901). The main device 100 starts the main power supply in response to the WOL magic packet (step S902).

Then, the display terminal 200 starts using the service offered by the main device 100. In FIG. 9, an example of the display terminal 200 remotely controlling the computer function of the main device 100 is illustrated. In other words, the image data (updated screen) generated in accordance with the event produced by the operation of the application program of the main device 100 is transmitted to the display terminal 200 via the network 400 and displayed on the screen of the display 201 of the display terminal 200 (steps S903 and S905). The input information that represents the operation input by the user on the display terminal 200 is transmitted to the main device 100 via the network 400 (step S904).

When the main device 100 detects the disconnection of the established connection (step S906), the main device 100 transmits a confirmation message to the display terminal 200 to confirm the possibility of reconnection (step S907).

The main device 100 is on standby for a predetermined period of time after the transmission of the confirmation message. The main device 100 sets the standby time to the response waiting time field in the confirmation message. After receiving the confirmation message from the main device 100, the display terminal 200 generates and transmits a reply message within the response waiting time.

For example, when the operation mode stored in the operation mode storage unit 222 indicates the remote controlling of the computer function of the main device 100 or the remote browsing of the media data stored in the main device 100, the display terminal 200 transmits a reply message that there is a possibility of reconnection to the main device 100 (mode A at step S908 in FIG. 10). Then, the main device 100 continues the operation.

When the operation mode of the display terminal 200 indicates browsing of the media data stored in the external memory device 203, the display terminal 200 transmits a reply message that there is no possibility of reconnection to the main device 100 (mode B at step S909 in FIG. 10).

When the power supply of the display terminal 200 is turned off, no reply message is transmitted from the display terminal 200 to the main device 100 (mode C in FIG. 10).

In the modes B and C of FIG. 10, the main device 100 turns the main power supply off after the response waiting time elapses. The confirmation message and the reply message are transmitted in accordance with the UDP as described above. These messages may be transmitted for several times by taking the conditions of the network 400 and the wireless transmission path into consideration.

In the communication system according to the first embodiment, when the main device detects a disconnection of the established connections with the display terminal, the device transmits a confirmation message to the display terminal to confirm the possibility of reconnection, and controls the switching of the main power supply of the main device in accordance with the reply message in response to the confirmation message. In this manner, the timings of shifting to the power saving mode and cutting the main power supply off can be reliably determined, without unconditionally turning the main power supply off at the time of detecting the disconnection of the established connections.

In a communication system according to a second embodiment, the display terminal transmits a notification message to the main device to notify the device of the possibility of reconnection before changing the operation mode of the display terminal, and, when the disconnection of the established connection is detected, the main device controls the disconnection of the main power supply of the main device on the basis of the notification message. If the notification message has been received, the main device does not have to transmit a confirmation message as in the first embodiment. Hence, the processing steps can be reduced.

Figure 11:
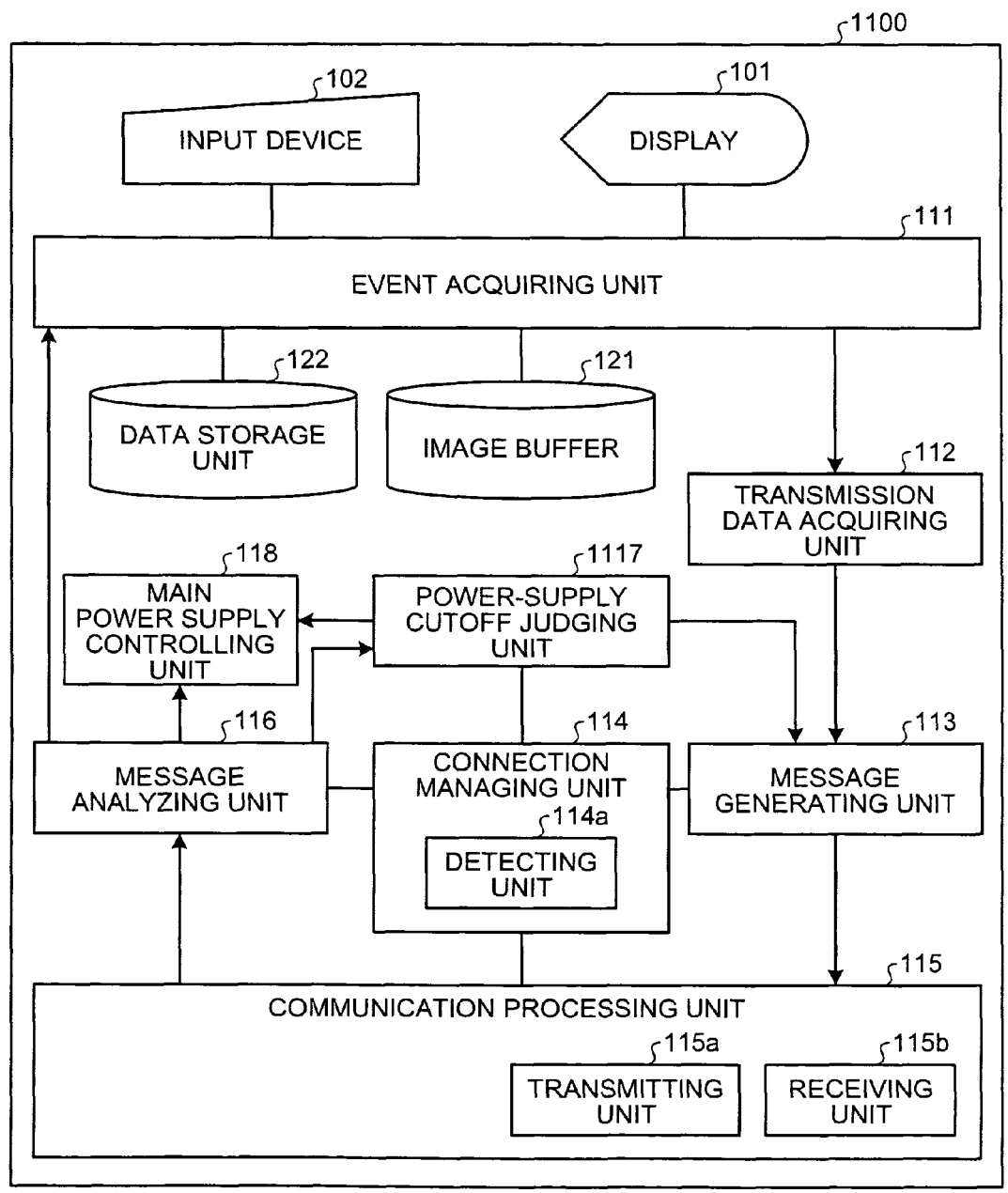
FIG. 11 is a block diagram for illustrating a structure of a main device according to a second embodiment.

As illustrated in FIG. 11, a main device 1100 includes the display 101, the input device 102, the image buffer 121, the data storage unit 122, the event acquiring unit 111, the transmission data acquiring unit 112, the message generating unit 113, the connection managing unit 114, the communication processing unit 115, the message analyzing unit 116, a power-supply cutoff judging unit 1117, and the main power supply controlling unit 118.

The second embodiment is different from the first embodiment in the function of the power-supply cutoff judging unit 1117. The rest of the structure and functions is the same as the block diagram of FIG. 2 for showing the structure of the main device 100 according to the first embodiment. Thus, the same numerals are given to the same components, and the explanation thereof is omitted.

The power-supply cutoff judging unit 1117 is provided with an additional function of determining whether the main power supply should be turned off when the disconnection of the established connection is detected, based on the notification message received before while the connection is maintained. This makes the power-supply cutoff judging unit 1117 different from the power-supply cutoff judging unit 117 according to the first embodiment. If a notification message is not received, the power-supply cutoff judging unit 1117 determines whether the main power supply should be turned off, based on the exchanged confirmation message and reply message in the same manner as the first embodiment.

Figure 12:
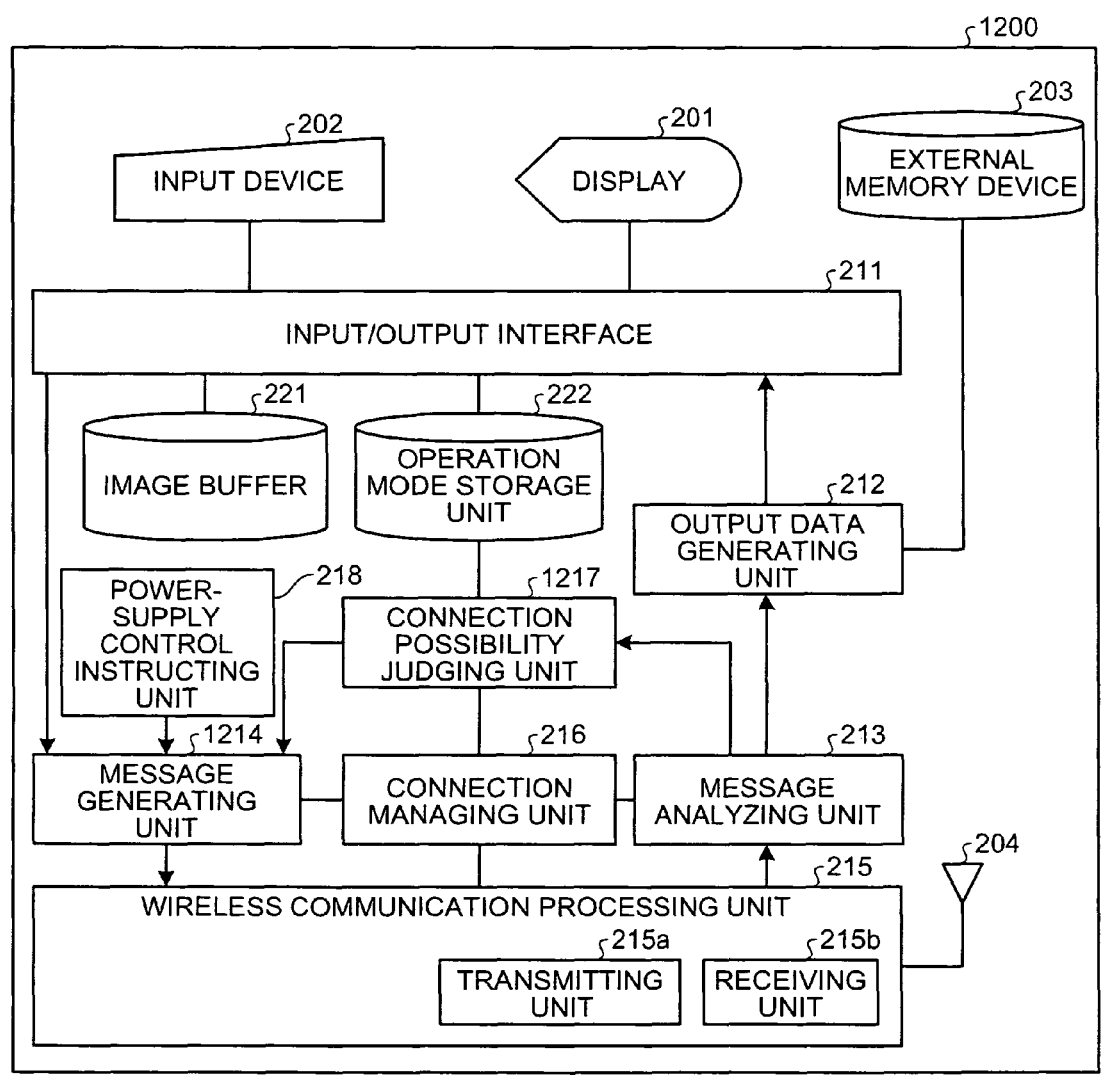
FIG. 12 is a block diagram for illustrating a structure of a display terminal according to the second embodiment.

As illustrated in FIG. 12, a display terminal 1200 includes the display 201, the input device 202, the external memory device 203, the antenna 204, the image buffer 221, the operation mode storage unit 222, the input/output interface 211, the output data generating unit 212, the message analyzing unit 213, a message generating unit 1214, the wireless communication processing unit 215, the connection managing unit 216, a connection possibility judging unit 1217, and the power-supply control instructing unit 218. The display terminal 1200 also includes a speaker to output audio data, although it is not shown in the drawing.

The second embodiment is different from the first embodiment in the functions of the message generating unit 1214 and the connection possibility judging unit 1217. The rest of the structure and functions is the same as the block diagram of FIG. 3 showing the structure of the display terminal 200 according to the first embodiment. Thus, the same numerals are given to the same components, and the explanation thereof is omitted.

The connection possibility judging unit 1217 is provided with an additional function of judging, when the operation mode of the display terminal 1200 is to be changed, whether there is a possibility of reconnection in the new operation mode, and issuing an instruction to the message generating unit 1214 to generate and transmit a notification message for notifying the main device 100 of the judgment result. This function makes the connection possibility judging unit 1217 different from the connection possibility judging unit 217 according to the first embodiment.

The message generating unit 1214 is provided with an additional function of generating a notification message in response to the instruction of the connection possibility judging unit 1217 and transmitting the message to the main device 1100. This makes the message generating unit 1214 different from the message generating unit 214 according to the first embodiment.

The notification message generated by the message generating unit 1214 has the same structure as the reply message according to the first embodiment in FIG. 7. For the identifier, however, unique information is provided to indicate that it is a notification message representing the possibility of reconnection. In other words, a value different from the identifier of the reply message is set to this identifier. The notification message is used to notify the main device 1100 of the possibility of reconnection in the new operation mode before the display terminal 1200 changes its operation mode.

Figure 13:
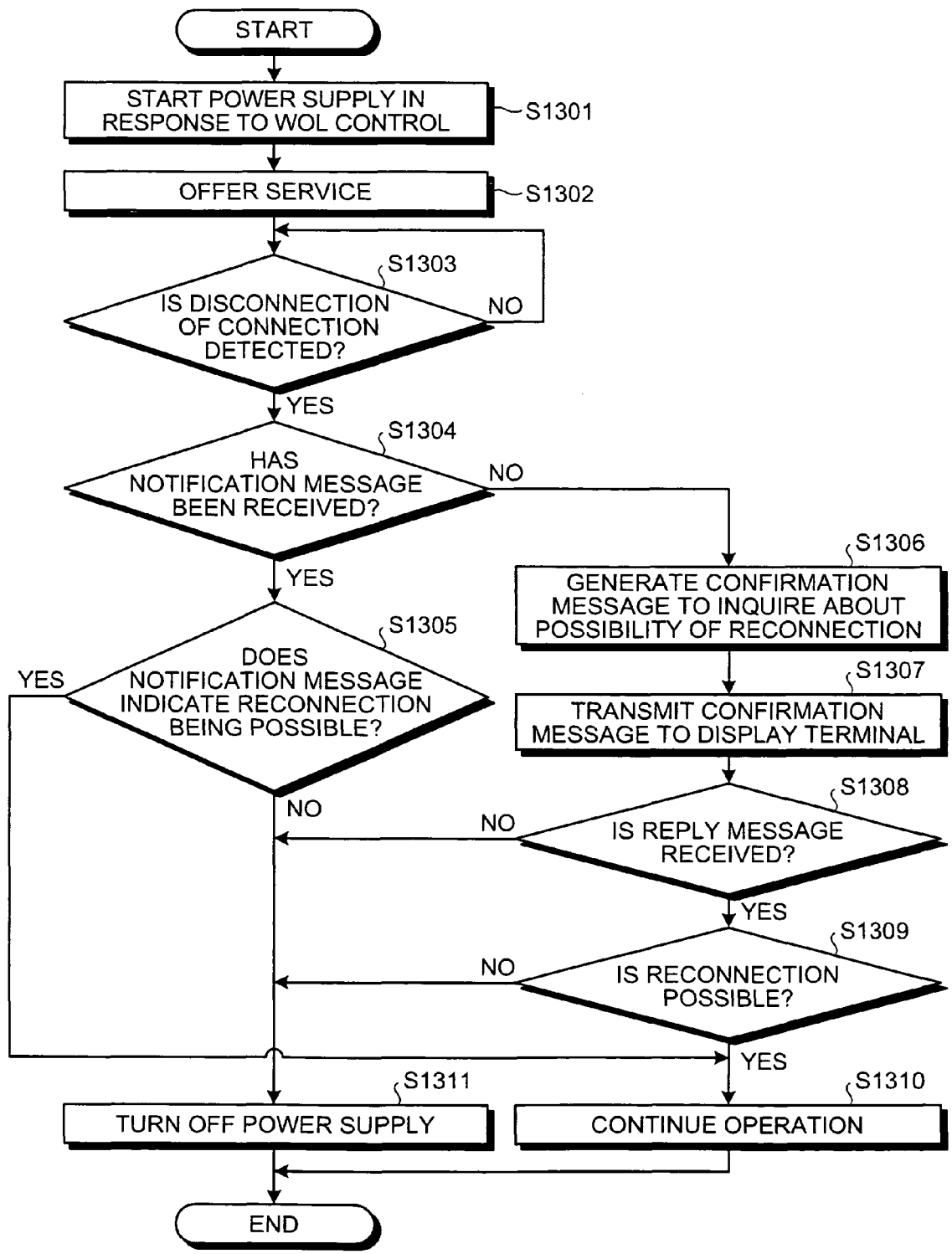
FIG. 13 is a flowchart for illustrating the entire power supply controlling process according to the second embodiment.

The main power supply controlling process performed by the main device 1100 according to the second embodiment is explained below with reference to FIG. 13.

The processes of WOL starting, service offering, and disconnection detecting at steps S1301 to S1303 are the same as the processes performed by the main device 100 at steps S801 to S803 according to the first embodiment, and thus the explanation thereof is omitted.

When a disconnection of the established connection is detected at step S1303 (yes at step S1303), the power-supply cutoff judging unit 1117 determines whether a notification message has been received from the display terminal 1200 (step S1304).

According to the second embodiment, the display terminal 1200 always transmits a notification message regarding the possibility of later reconnection to the main device 1100 before the operation mode changes, unless the main power supply is suddenly turned off by the user. As a result, the main device 1100 can make a judgment on a shift to the energy saving mode and the switching of the main power supply, based on the notification message that has been received before the connection is disconnected.

For example, in the operation mode of remotely controlling the computer function of the main device 1100, the display terminal 1200 judges the possibility of reconnection to the main device 1100, based on the information of the new operation mode, before the TCP session established with the main device 1100 is disconnected. Then, the display terminal 1200 transmits a notification message that indicates the possibility of reconnection.

The notification message is received by the receiving unit 115*b* of the communication processing unit 115, and stored in a predetermined storage unit (not shown), for example. The power-supply cutoff judging unit 1117 can determine whether a notification message has been received, depending on a notification message or no notification message stored in this storage unit. The determining method is not limited thereto. For example, when a notification message is received, information indicating the reception and the value of the reconnection possibility field in the notification message may be stored in the storage unit or the like so that the judgment can be made by referring to this information. The power-supply cutoff judging unit 1117 deletes the stored information regarding the notification message after the judgment.

When no notification message is received (no at step S1304), the power-supply cutoff judging unit 1117 issues an instruction to the message generating unit 113 to generate and transmit a confirmation message. The subsequent processes executed at steps S1306 through S1310, which include the confirmation message generating and transmitting process, the reception confirming process, and the connection possibility judging process are the same as the processes executed at steps S804 through S808 by the main device 100 according to the first embodiment, and thus the explanation is omitted.

When a notification message has been received (yes at step S1304), the power-supply cutoff judging unit 1117 determines whether the notification message indicates that there is a possibility of reconnection (step S1305).

When the notification message indicates that there is a possibility of reconnection (yes at step S1305), the power-supply cutoff judging unit 1117 does not issue an instruction to the main power supply controlling unit 118 to turn off the main power supply, and therefore the main device 1100 continues its operation (step S1310).

When the notification message indicates that there is no possibility of reconnection (no at step S1305), the power-supply cutoff judging unit 1117 issues an instruction to the main power supply controlling unit 118 to turn off the main power supply. In response to this instruction, the main power supply controlling unit 118 turns the main power supply off (step S1311).

Figure 14:
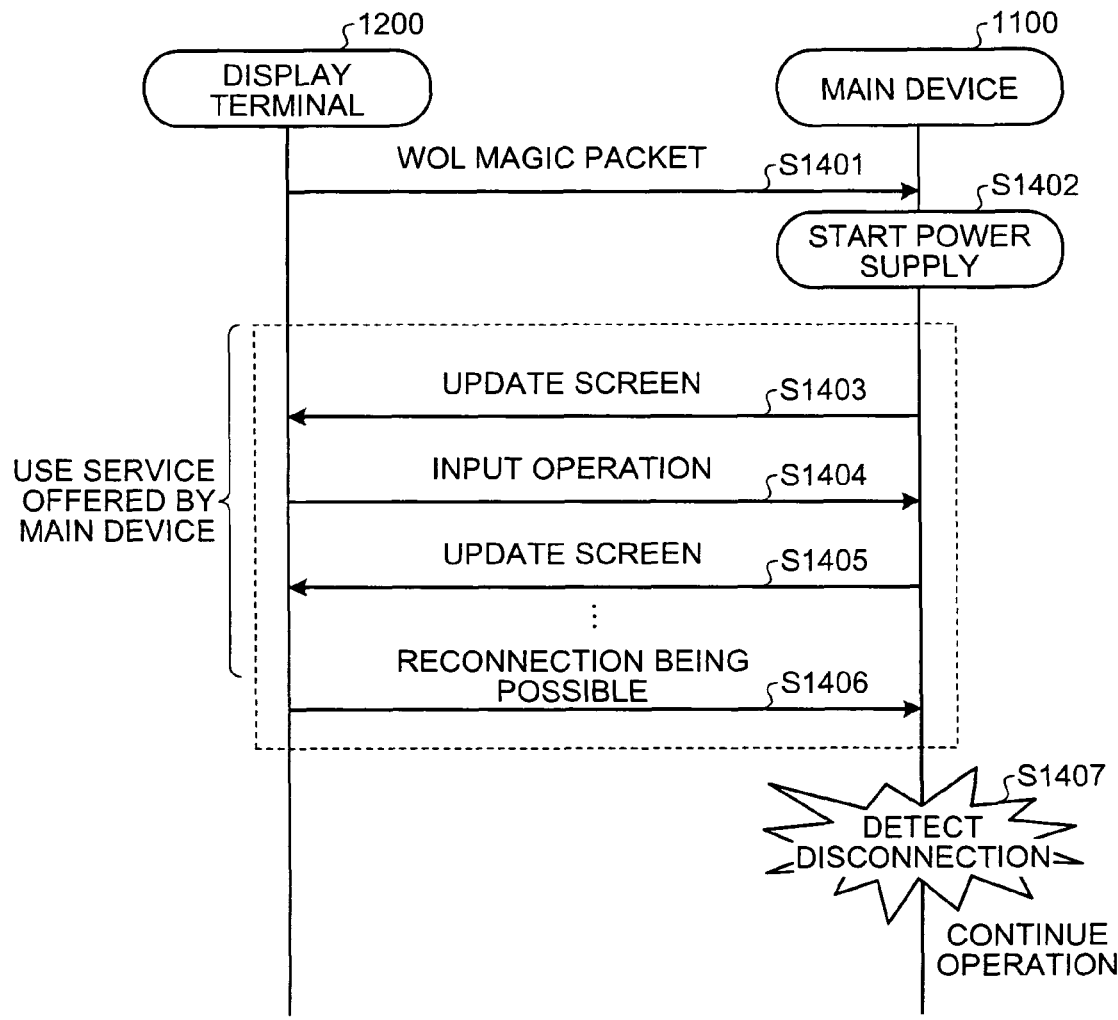
FIG. 14 is a sequence diagram including a message exchange sequence between the display terminal and the main device according to the second embodiment.

In FIG. 14, an example of the display terminal 1200 remotely controlling the computer function of the main device 1100 is illustrated.

The processes of steps S1401 to S1405 are the same as the processes of steps S901 to S905 according to the first embodiment in the sequence diagram of FIG. 9, and thus the explanation is omitted.

It is assumed here that the display terminal 1200 is changed through the user's input operation from the operation mode of remotely controlling the computer function of the main device 1100 to the operation mode of remotely browsing the media data stored in the main device 1100. When the operation mode is changed in this manner, the display terminal 1200 generates a notification message regarding the possibility of future reconnection and transmits the message to the main device 1100 before the connection for the remote controlling of the computer function is disconnected (step S1406).

FIG. 14 is a diagram for illustrating an example of transmission of a notification message indicating that there is a possibility of future reconnection. When the display terminal 1200 terminates the connection for the remote controlling of the computer function, the main device 1100 detects the disconnection of the established connection (step S1407). According to the present embodiment, the main device 1100 refers to the notification message received at step S1406 and determines that there is a possibility of reconnection. Thus, main device 1100 continues the operation.

When, for example, the display terminal 1200 is shifted to the operation mode of browsing the media data stored in the external memory device 203, a notification message indicating that there is no possibility of future reconnection is transmitted. Thus, after detecting the disconnection of the established connections, the main device 1100 determines that the main power supply should be turned off.

If the communications are disconnected by the user turning off the power supply of the display terminal 1200, a notification message cannot be transmitted to the main device 1100. Thus, the main device 1100 transmits a confirmation message to confirm the possibility of future reconnection in the same manner as the first embodiment. In this case, because a reply message cannot be received, the main device 1100 turns off the main power supply.

In the communication system according to the second embodiment, the display terminal transmits to the main device a notification message that notifies the device of the possibility of future reconnection before the communications are disconnected. Hence, after detecting the disconnection of the established connections, the main device can efficiently judge whether the main power supply should be turned off, simply by referring to the notification message.

Figure 15:
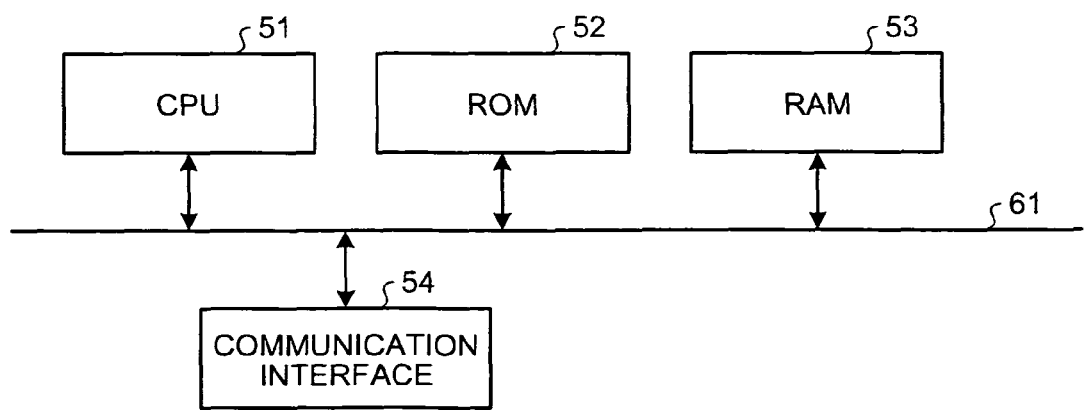
FIG. 15 is a diagram for explaining a hardware structure for the communication apparatus and the display apparatus according to the first and second embodiments.

The hardware structure of the main device (communication apparatus) and the display terminal (display apparatus) according to the first and second embodiments is now explained with reference to FIG. 15.

The communication apparatus and the display apparatus according to the first and second embodiments include a control device such as a central processing unit (CPU) 51, memory devices such as a read only memory (ROM) 52 and a random access memory (RAM) 53, a communication interface 54 for connecting to a network to perform communications, external memory devices such as a hard disk drive (HDD) and a compact disc (CD) drive, a display apparatus, input devices such as a keyboard and a mouse, and a bus 61 that connect these components to one another. The hardware structure employs a regular computer.

A computer program product for power supply control executed by the communication apparatus and a computer program product for communication executed by the display apparatus according to the first and second embodiments are recorded and offered in files of an installable or executable format in a computer readable medium such as a compact disk read only memory (CD-ROM), a flexible disk (FD), a compact disk recordable (CD-R), and a digital versatile disk (DVD).

Computer program products for power supply control and communication according to the first and second embodiments may be stored in a ROM or like in advance.

The computer program products for power supply control executed by the communication apparatus according to the first and second embodiments has a module structure including the above units (the event acquiring unit, the transmission data acquiring unit, the message generating unit, the connection managing unit, the communication processing unit, the message analyzing unit, the power-supply cutoff judging unit, and the main power supply controlling unit). As actual hardware, the CPU 51 (processor) reads the power supply control program from the above memory medium and executes the program so that the units are loaded and generated onto the main memory device.

The computer program products for communication executed by the display apparatus according to the first and second embodiments has a module structure including the above units (the input/output interface, the output data generating unit, the message analyzing unit, the message generating unit, the wireless communication processing unit, the connection managing unit, the connection possibility judging unit, and the power-supply control instructing unit). As actual hardware, the CPU 51 (processor) reads the computer program products for communication from the above memory medium and executes the computer program products so that the units are loaded and generated onto the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
a receiving unit that receives from a communication apparatus, a confirmation message that confirms whether connections are to be established with the communication apparatus that transmits image data;
a judging unit that judges whether the connections are to be established on the basis of an operation mode of an application program that runs on the display apparatus and that accesses information stored on the display apparatus or on the communication apparatus when the confirmation message is received;
a generating unit that generates a reply message indicating whether the connections are to be established and responding to the confirmation message, on the basis of a judgment result made by the judging unit; and
a transmitting unit that transmits the reply message to the communication apparatus, wherein
the judging unit further judges, when a change is to be made to the operation mode, whether the connections are to be established based on an operation mode after the change,
the generating unit further generates, when the change is to be made to the operation mode, a notification message that is notified during the connections being established to indicate whether the connections are to be established, based on a judgment result made by the judging unit, and
the transmitting unit transmits the notification message to the communication apparatus before the change is made to the operation mode.

2. The apparatus according to claim 1, further comprising:
a storage unit that stores media data including any of audio data, video data, and image data; and
an output unit that outputs the media data, wherein
the judging unit judges that the connections are not to be established during an operation mode in which the output unit outputs the media data.

3. The apparatus according to claim 1, wherein the judging unit judges that the connections are to be established during an operation mode of displaying the image data received from the communication apparatus.

4. A communication method comprising:
receiving from a communication apparatus, a confirmation message that confirms whether connections are to be established with the communication apparatus that transmits image data;
first judging including judging whether the connections are to be established on the basis an operation mode of an application program that runs on a display apparatus and that accesses information stored on the display apparatus or on the communication apparatus when the confirmation message is received;
first generating including generating a reply message indicating whether the connections are to be established, on the basis of a judging result of the first judging;
transmitting the reply message to the communication apparatus;
second judging including judging, when a change is to be made to the operation mode, whether the connections are to be established based on an operation mode after the change,
second generating including generating, when the change is to be made to the operation mode, a notification message that is notified during the connections being established to indicate whether the connections are to be established, based on a judging result of the second judging, and
transmitting the notification message to the communication apparatus before the change is made to the operation mode.

5. A computer program product including a non-transitory computer readable medium including instructions for communications, wherein the instructions, when executed by a computer, cause the computer to perform operations comprising:
receiving from a communication apparatus, a confirmation message that confirms whether connections are to be established with the communication apparatus that transmits image data;
first judging including judging whether the connections are to be established on the basis of an operation mode of an application program that runs on a display apparatus and that accesses information stored on the display apparatus or on the communication apparatus when the confirmation message is received;
first generating including generating a reply message indicating whether the connections are to be established, on the basis of a judging result of the first judging;

transmitting the reply message to the communication apparatus;

second judging including judging, when a change is to be made to the operation mode, whether the connections are to be established based on an operation mode after the change, second generating including generating, when the change is to be made to the operation mode, a notification message that is notified during the connections being established to indicate whether the connections are to be established, based on a judging result of the second judging, and transmitting the notification message to the communication apparatus before the change is made to the operation mode.

* * * * *